(12) United States Patent
Nakagawa

(10) Patent No.: US 6,300,611 B1
(45) Date of Patent: Oct. 9, 2001

(54) FOCUS DETECTING DEVICE AND APPARATUS HAVING THE SAME

(75) Inventor: Kazuyuki Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/420,105

(22) Filed: Oct. 18, 1999

(30) Foreign Application Priority Data

Oct. 21, 1998 (JP) .................................................. 10-317017

(51) Int. Cl.⁷ .................................................. G02B 17/02
(52) U.S. Cl. .................................... 250/201.2; 250/201.4; 250/216; 397/97
(58) Field of Search .............................. 250/201.2, 201.4, 250/201.6, 201.7, 201.8, 216, 234; 396/97, 111, 114, 529

(56) References Cited

U.S. PATENT DOCUMENTS

| 4,413,894 | * | 11/1983 | Miki et al. ............................ 396/137 |
| 5,870,636 | * | 2/1999 | Sugita et al. ......................... 396/106 |
| 5,946,516 | * | 8/1999 | Yoshida et al. ....................... 396/529 |

* cited by examiner

*Primary Examiner*—Stephone B. Allen
(74) *Attorney, Agent, or Firm*—Robin, Blecker & Daley

(57) ABSTRACT

A focus detecting device having a focus detecting sensor, a first holding member which holds the focus detecting sensor and a second holding member which holds at least an optical element is arranged to permit adjustment of a joint angle between the first holding member and the second holding member in the directions of a plurality of axes by forming, into a curved surface shape, at least one of a joint surface formed on the first holding member for joining with the second holding member and a joint surface formed on the second holding member for joining with the first holding member.

16 Claims, 7 Drawing Sheets

FOCUS DETECTING DEVICE AND APPARATUS HAVING THE SAME

BACKGROUND OF THE INVENTION

1. Field of the Invention

The present invention relates to a focus detecting device having a plurality of focus detecting areas and, more particularly, to an arrangement for joining together a focus detection sensor and a holding member which holds an optical member.

2. Description of Related Art

In Japanese Laid-Open Patent Application No. HEI 8-29652, there is disclosed, as shown in FIG. 7, an arrangement in which the positioning of a focus detecting sensor 1100 with respect to a body block 1000 is effected by pushing a pair of shafts 1210 provided on a sensor holder 1200 against a pair of bearings provided on the body block 1000.

According to the arrangement disclosed in the above Japanese Laid-Open Patent Application No. HEI 8-29652, however, the inclination of a focus detecting device with respect to an optical axis is adjustable only in the direction of rotation around the pair of shafts 1210. Depending on the allocation of a field of focus detection, therefore, any slanting state of the focus detecting sensor 1100 might be left unadjusted. Under such a condition, there is a possibility that it is impossible to have any adequate performance of the focus detecting device.

BRIEF SUMMARY OF THE INVENTION

In accordance with one aspect of the invention, there is provided a focus detecting device having a first holding member which holds a focus detecting sensor and a second holding member which holds at least an optical element, wherein at least one of a joint surface formed on the first holding member for joining with the second holding member and a joint surface formed on the second holding member for joining with the first holding member is in a curved surface shape, so that an angle at which the first holding member and the second holding member are mounted relative to each other is adjustable in directions of a plurality of axes.

The above and other aspects and features of the invention will become apparent from the following detailed description of a preferred embodiment thereof taken in connection with the accompanying drawings.

DETAILED DESCRIPTION OF THE INVENTION

Hereinafter, preferred embodiments of the invention will be described in detail with reference to the drawings.

Figure 1:
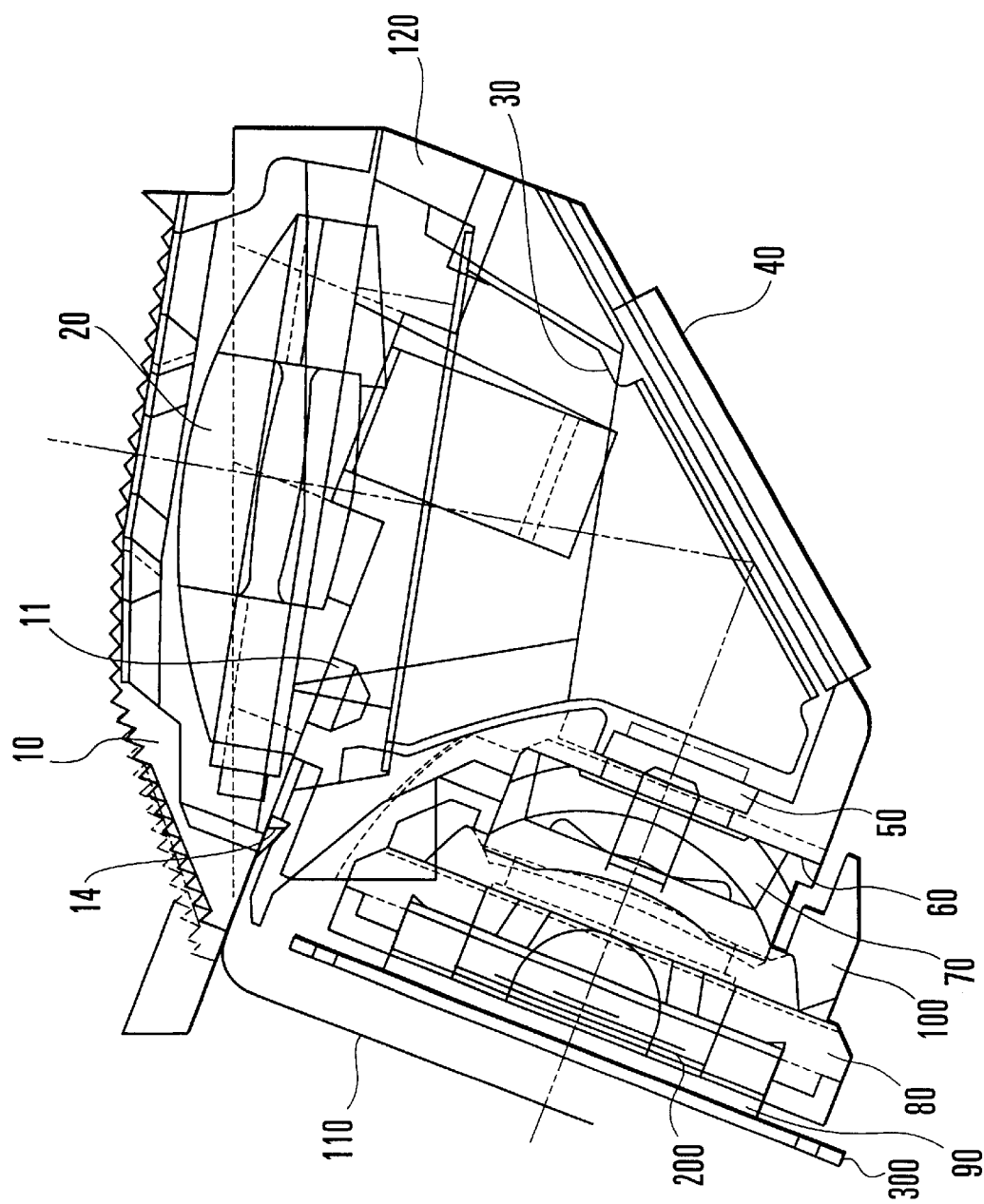
FIG. 1 is a sectional view showing a sensor adjustment part of a focus detecting device according to an embodiment of the invention.
Figure 2:
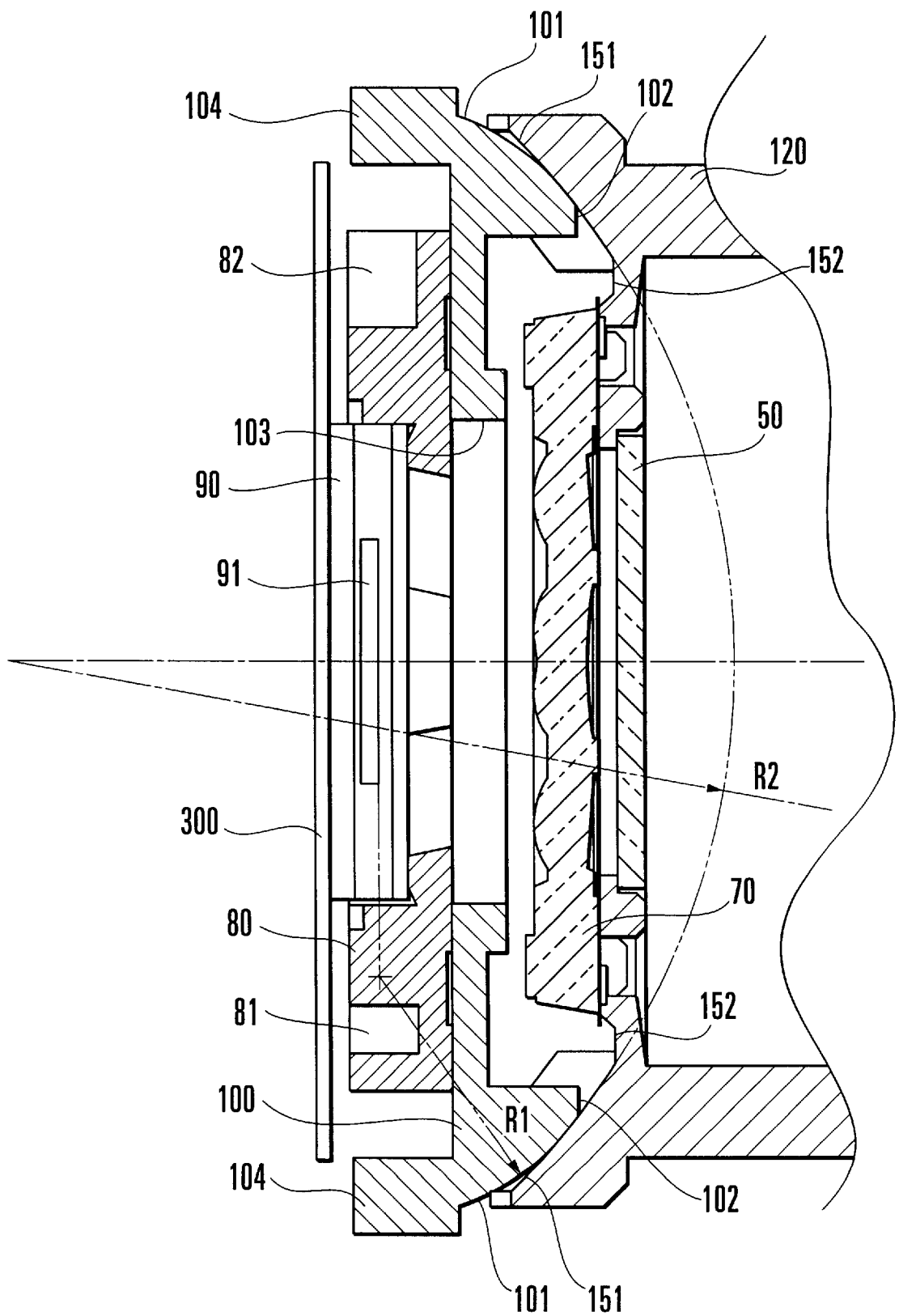
FIG. 2 is a sectional view showing the sensor adjustment part shown in FIG. 1 as viewed from a direction which differs from the viewing direction in FIG. 1.
Figure 3:
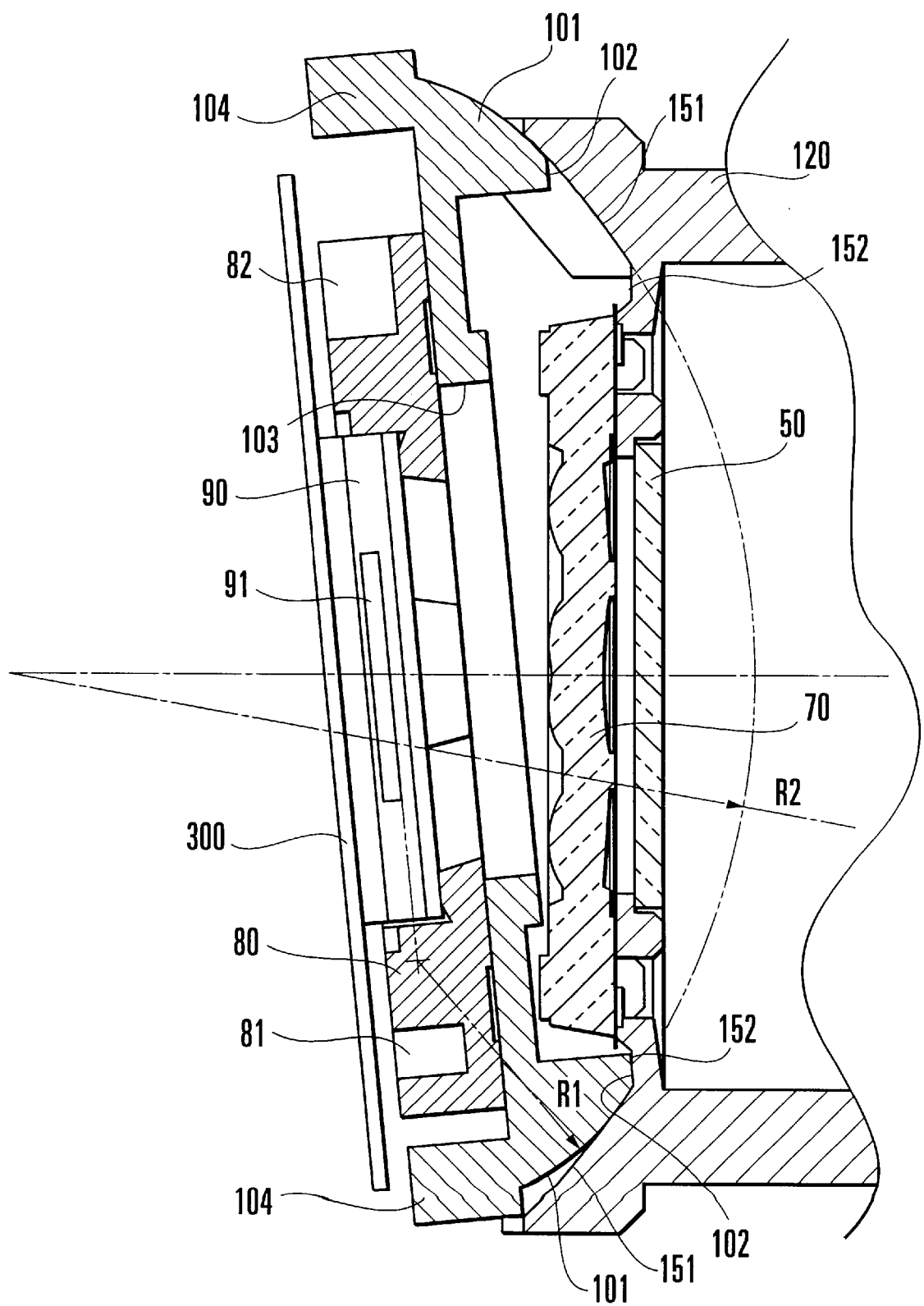
FIG. 3 is a sectional view showing the sensor adjustment part shown in FIG. 2 in a state where the angle of a sensor is in process of being adjusted.
Figure 4:
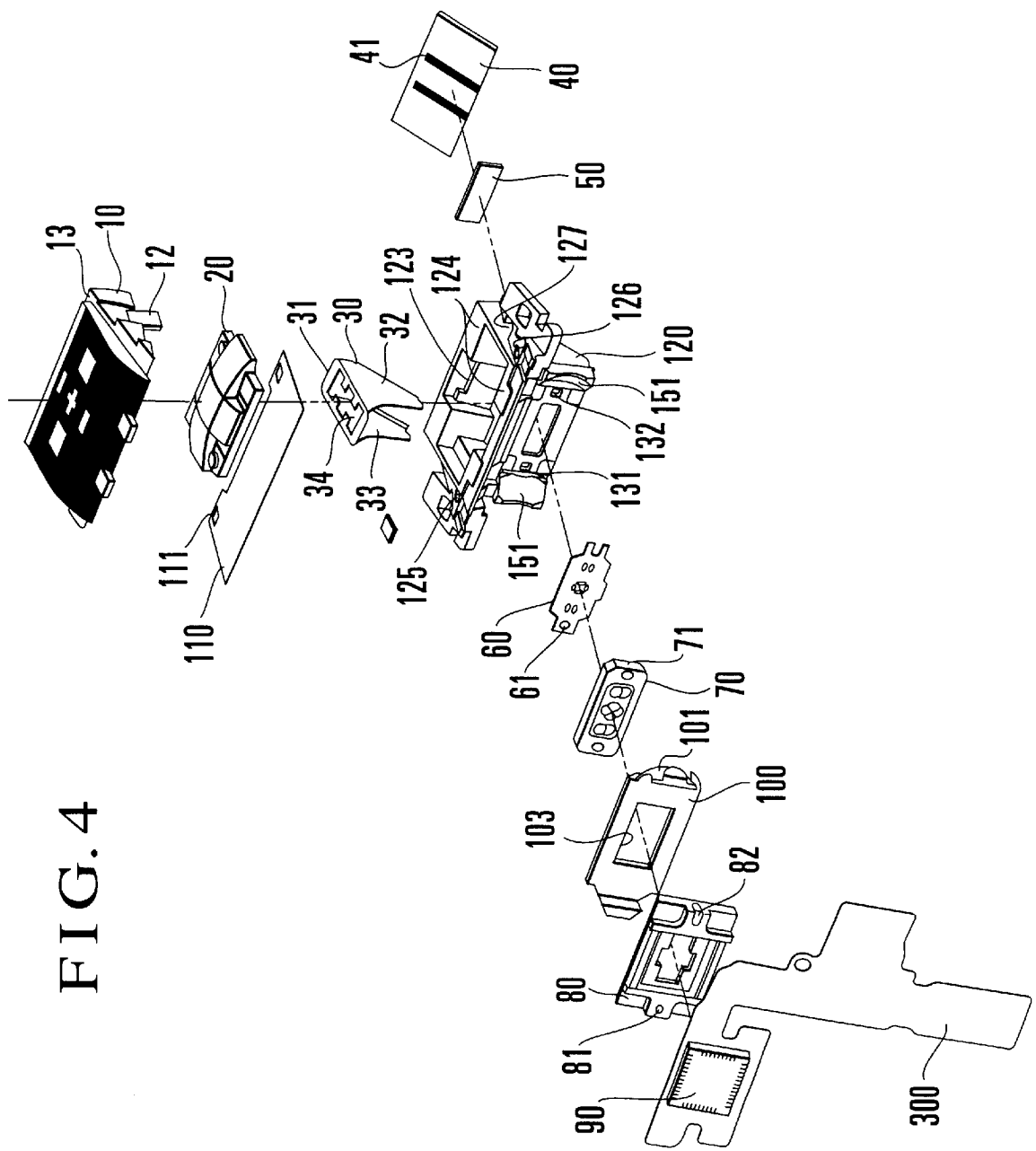
FIG. 4 is an exploded perspective view showing the focus detecting device including the sensor adjustment part shown in FIG. 1.
Figure 5:
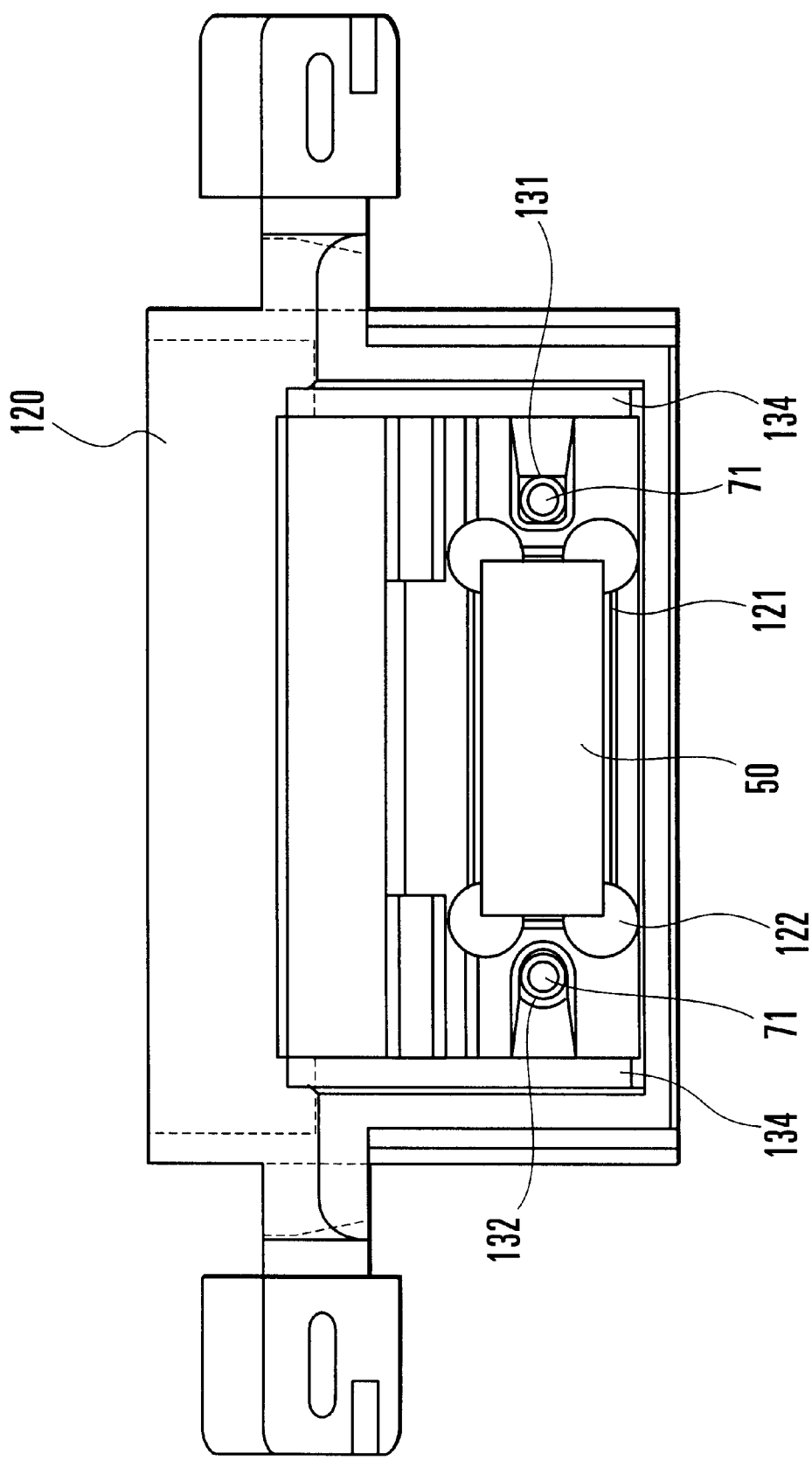
FIG. 5 shows a focus detecting unit including the sensor adjustment part shown in FIG. 1 in a state where an infrared-cut filter is mounted on the focus detecting unit.
Figure 6:
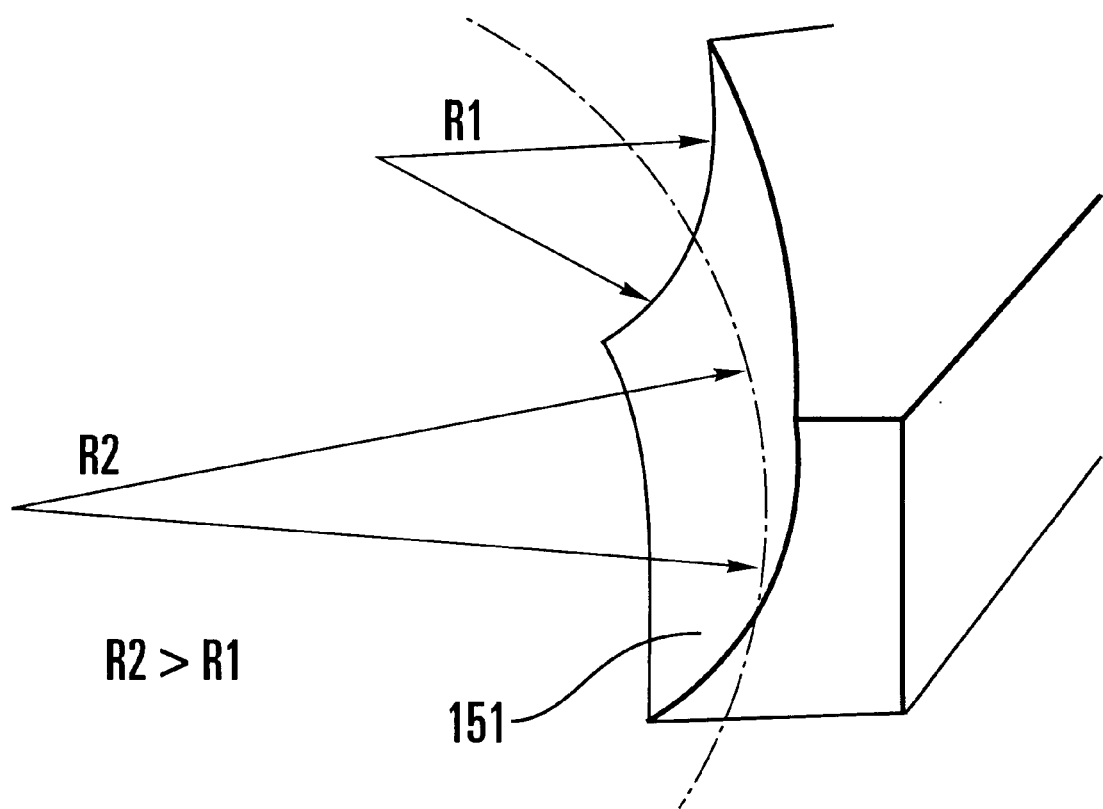
FIG. 6 is a perspective view showing exaggeratedly the shape of a sensor-support-member abutting surface provided on a body block in the sensor adjustment part shown in FIG. 1.
Figure 7:
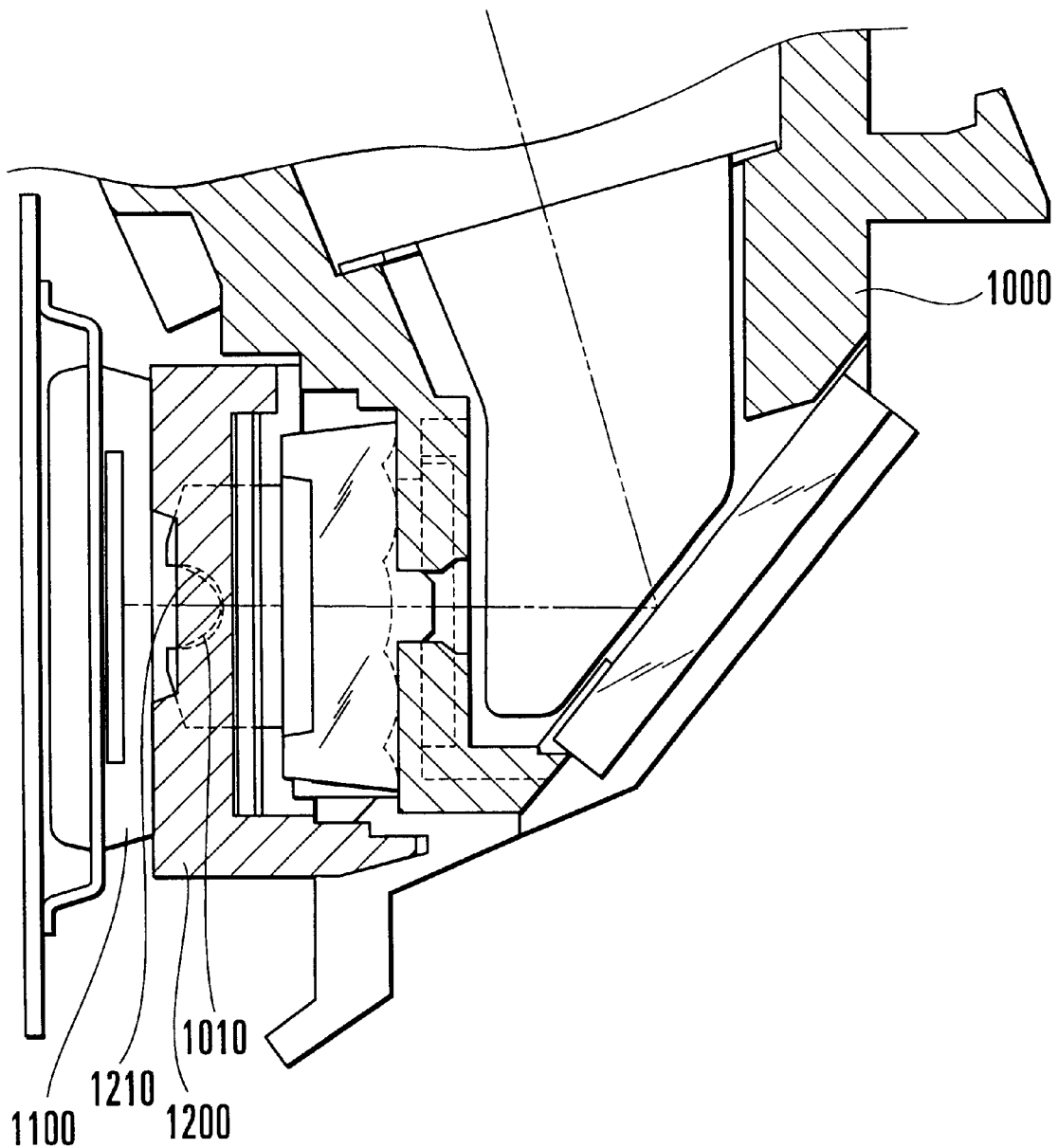
FIG. 7 is a sectional view showing the arrangement of a conventional sensor holding mechanism.

FIG. 1 is a sectional view showing a sensor adjustment part of a focus detecting device adapted, for example, for a camera. FIG. 2 is a sectional view of the sensor adjustment part shown in FIG. 1 as viewed from a direction which differs from the viewing direction in FIG. 1. FIG. 3 is a sectional view showing the sensor adjustment part shown in FIG. 2 in a state where the angle of a sensor is in process of being adjusted. FIG. 4 is an exploded perspective view showing the focus detecting device including the sensor adjustment part shown in FIG. 1. FIG. 5 shows a focus detecting unit including the sensor adjustment part shown in FIG. 1 in a state where an infrared-cut filter is mounted on the focus detecting unit. FIG. 6 is a perspective view showing exaggeratedly the shape of a sensor-support-member abutting surface provided on a body block in the sensor adjustment part shown in FIG. 1.

Referring to FIG. 1, a field mask 10 is arranged to eliminate unnecessary light flux parts by dividing a focus detection light flux. A split field lens 20 is arranged to lead to a sensor 90 an image to be formed on a primary image forming plane. A light-blocking plate 30 is arranged to separate the light flux of a central focus detecting field and the light flux of a peripheral focus detecting field from each other and to prevent light fluxes other than an effective light flux corresponding to each focus detecting field from entering the sensor 90. A surface mirror 40 is arranged to bend the focus detection light flux incident on the focus detecting unit toward the sensor 90. An infrared-cut filter 50 is arranged to remove infrared light.

A multiple-aperture diaphragm 60 is arranged to split the focus detection light flux. A reimaging lens 70 is an optical member having a plurality of pairs of lens elements for forming an image on the sensor 90. The reimaging lens 70 has a pair of positioning dowels.

A sensor holder 80 is arranged to hold the sensor 90. A sensor support member 100 is provided for adjusting the inclination of the sensor 90. The sensor 90 is composed of a plurality of pairs of line sensors. A circuit board 300 has the sensor 90 mounted thereon. A light-blocking sheet 110 is arranged to cover any gap or clearance between the focus detecting unit and the focus-detecting-unit mounting part of the camera. A body block 120 is arranged to hold the various component parts of the focus detecting unit and to shield these parts from external light.

In the structural arrangement of the focus detecting device described above, the field mask 10, the split field lens 20, the light-blocking plate 30, the mirror 40, the infrared-cut filter 50, the multiple-aperture diaphragm 60, the reimaging lens 70, the sensor holder 80, the sensor support member 100, the sensor 90 and the light-blocking sheet 110 are mounted on the body block 120. The field mask 10 is positioned by fitting shafts and fitting holes and is fixed to the body block 120. The split field lens 20 is secured by bonding to the body block 120. The light-blocking plate 30, the mirror 40 and the infrared-cut filter 50 are secured by bonding to the body block 120 after they are positioned.

The multiple-aperture diaphragm 60 is positioned and secured to the reimaging lens 70 by using holes and slots provided in the multiple-aperture diaphragm 60 in conjunction with a plurality of dowels provided on the reimaging lens 70. The reimaging lens 70 is positioned and secured to the body block 120 by using positioning holes provided in the body block 120 and dowels provided on the reimaging lens 70 for positioning the reimaging lens 70. The reimaging lens 70 and the body block 120 are fixed in their positions to have the multiple-aperture diaphragm 60 sandwiched in between them in such a way as to prevent the position of the multiple-aperture diaphragm 60 from deviating with respect to the body bock 120 and the reimaging lens 70.

The sensor 90 is bonded and secured to the sensor holder 80 beforehand in a state of being mounted on the circuit board 300. The inclination, with respect to the body block 120, of the sensor 90 and the sensor holder 80 is thus adjusted as one sensor unit 200.

The sensor unit 200 is held in position with respect to the body block 120 through the sensor support member 100. The inclination of the sensor 90 with respect to the focus detecting device is adjusted between the body block 120 and the sensor support member 100. The sensor unit 200 is bonded and fixed after completion of various adjusting actions on the sensor support member 100.

The sensor support member 100 is positioned with respect to the body block 120 by means of at least one spherical positioning adjustment part provided on the sensor support member 100. The spherical positioning adjustment part of the sensor support member 100 is arranged to permit adjustment of the inclination of the sensor support member 100 with respect to the body block 120 in the directions of a plurality of axes. The light-blocking sheet 110 is interposed in between the field mask 10 and the body block 120 and is held by a light-blocking-sheet positioning part 14 provided on the field mask 10.

The arrangement of the sensor adjustment part is next described with reference to FIGS. 1, 2 and 3. In FIGS. 1, 2 and 3, reference numeral 91 denotes a sensor chip of the sensor 90 held on the sensor holder 80. The sensor holder 80 and the sensor 90 are bonded and fixed to each other. The position and inclination of the sensor 90 are thus adjusted with the sensor 90 and the sensor holder 80 in the unified state. The adjustment permits addition of such a shape of the sensor 90 that facilitates holding with a tool.

The sensor support member 100 is provided with body-block abutting surfaces 101 which are formed as shown in FIG. 2. At the body-block abutting surfaces 101, the sensor support member 100 abuts on the body block 120.

The body block 120 is provided with sensor-support-member abutting surfaces 151 at parts corresponding to the body-block abutting surfaces 101 of the sensor support member 100.

Each of the body-block abutting surfaces 101 is in a convex spherical shape formed by cutting out a part of a sphere having a radius R1, as shown in FIG. 2. The center of the spherical shape of radius R1 of the body-block abutting surface 101 is arranged to be located approximately at the sensor chip 91 of the sensor 90.

Each of the sensor-support-member abutting surfaces 151 of the body block 120 is in a concave shape formed by turning the body-block abutting surface 101 (a convex spherical shape of radius R1) with a radius R2, which is larger than the radius R1. Thus, as shown in FIG. 6, each of the sensor-support-member abutting surfaces 151 of the body block 120 is in such a concave shape that an arc of radius R2 is drawn with a groove of radius R1 in the depth direction thereof.

As a result, the amount of movement of the sensor support member 100 with respect to the body block 120 at the time of adjustment becomes larger in the direction parallel with the plane of a circle of the radius R2 than in the direction parallel with the plane of a circle of the radius R1. Therefore, an aperture part 103 provided in the sensor support member 100 for passing an effective light flux is arranged to have a larger aperture width in the direction for the radius R2 than in the direction for the radius R1.

Reference numeral 102 denotes a sensor-support-member rotation restricting part of the sensor support member 100. Reference numeral 152 denotes a sensor-support-member rotation restricting part of the body block 120.

As shown in FIG. 3, the sensor-support-member rotation restricting part 102 and the sensor-support-member rotation restricting part 152 are arranged to prevent the sensor support member 100 from rotating to any degree more than necessary, by coming into contact with each other.

By virtue of the above arrangement, the sensor support member 100 can be arranged not to come into contact with the reimaging lens 70 with the reimaging lens 70 interposed in between the body block 120 and the sensor support member 100.

The position and inclination of the sensor 90 are adjusted, with the sensor 90 in the state of adhering to the sensor holder 80, by applying a driving force from a driving member (not shown) to each of the driving parts 81 and 82 provided on the sensor holder 80. The shape of each of the sensor-support-member abutting surfaces 151 varies with the directions of adjustment.

To assist driving in the direction parallel with the plane of a circle of the radius R2 of the sensor-support-member abutting surface 151, the sensor support member 100 is provided with sensor-support-member driving assisting parts 104 so as to allow the sensor support member 100 to be directly driven. The provision of the sensor-support-member driving assisting parts 104 facilitates the adjustment work on the sensor 90.

FIG. 4 is an exploded perspective view showing a focus detecting device which includes the arrangement described above. FIG. 5 shows a focus detecting unit as having an infrared-cut filter mounted thereon. The component members of the focus detecting device having the above-stated arrangement are described in detail below.

Referring to FIG. 4, the body block 120 is formed to have various positioning and fixing shapes for fixing the focus detecting unit after positioning the focus detecting unit. The infrared-cut filter 50 shown in FIG. 5 is positioned with respect to the body block 120 by mounting the infrared-cut filter 50 on an infrared-cut-filter positioning-and-fixing part 121 of the body block 120. After positioning, the infrared-cut filter 50 is bonded and fixed to the body block 120 by a plurality of infrared-cut-filter bonding parts 122 which are arranged around the infrared-cut-filter positioning-and-fixing part 121.

The light-blocking plate 30 is positioned with respect to the body block 120 by a light-blocking-plate positioning-and-fixing part 31 provided on the light blocking plate 30 and a light-blocking-plate positioning-and-fixing part 123 provided on the body block 120, and is mounted into an inner part of the body block 120. The light-blocking plate 30 is provided with walls 32 and 33 which are arranged to prevent unnecessary light fluxes other than an effective light flux of each of focus detecting fields passing through the split field lens 20 from entering other focus detecting fields. An aperture part 34 is formed between the walls 32 and 33 of the light-blocking plate 30 to pass a focus detection light flux therethrough. After completion of various adjusting actions thereon, the split field lens 20 is secured by bonding to the body block 120 through a split-field-lens securing part provided on the body block 120.

The field mask 10 is positioned with respect to the body block 120 by using a pair of field-mask-positioning fitting shafts 11 provided on the field mask 10 and a pair of fitting holes including a field-mask-positioning fitting hole 125 which restricts the plain movement of the field mask 10 within a mounting plane thereof and a field-mask-positioning fitting slot 126. After positioning, the field mask 10 is secured to the body block 120 by causing a pair of field-mask-fixing elastic claw parts 12 provided on the field mask 10 to engage a pair of field-mask-fixing holes 127 formed in the body block 120. Further, to prevent the field mask 10 from buoying up from the body block 120 after the focus detecting unit is mounted on the camera even when the pair of field-mask-fixing elastic claw parts 12 happen to disengage from the pair of field-mask-fixing holes 127, the field mask 10 is provided with a field-mask-buoying preventing part 13. The field-mask-buoying preventing part 13 serves also to lessen a gap between a mirror box of the camera and the focus detecting device.

The light-blocking sheet 110 is positioned by using a pair of light-blocking-sheet positioning holes 111 provided in the light-blocking sheet 110 and a pair of light-blocking-sheet positioning parts 14 provided on the field mask 10. After positioning, the light-blocking sheet 110 is secured to the body block 120 in a state of being interposed in between the field mask 10 and the body block 120.

The mirror 40 is positioned by using a mirror-positioning-and-fixing part 134 which is provided on the body block 120. After positioning, the mirror 40 is secured by bonding to the bock block 120. The mirror 40 has light-blocking mask parts 41 added to its surface in a mask-like shape to block unnecessary light fluxes for each of focus detecting fields. The light-blocking mask parts 41 are thus arranged to block unnecessary light fluxes passing through a gap between the light-blocking plate 30 and the mirror 40 in deflecting a focus detection light flux for the sensor and are formed approximately in parallel with the sensor arrays of the line sensors of peripheral focus detecting fields. Therefore, since there is no light-blocking pattern in the direction of splitting the focus detection light flux, no ghost is generated by reflection at any pattern edge part.

The reimaging lens 70 is positioned by a pair of reimaging-lens fitting shafts 71 of the reimaging lens 70 in conjunction with a pair of fitting holes formed in the body block 120 including a reimaging-lens positioning square hole 131 and a reimaging-lens positioning slot 132. After positioning, the reimaging lens 70 is secured by bonding to the body block 120.

The multiple-aperture diaphragm 60 is positioned with respect to the reimaging lens 70 by a pair of positioning parts 61 which correspond to the fitting shafts 71 of the reimaging lens 70. After positioning, the multiple-aperture diaphragm 60 is held in position with respect to the body block 120 in a state of being interposed in between the reimaging lens 70 and the body block 120.

The sensor support member 100 is positioned with respect to the body block 120 by using the pair of body-block abutting surfaces 101 which are provided on the sensor support member 100 in a spherical shape having the radius R1 for positioning adjustment and the pair of sensor-support-member abutting surfaces 151 which are formed on the side of the body block 120 in a spherical shape having a plurality of radii of curvature, i.e., the radii R1 and R2. The sensor support member 100 is thus positioned for swinging adjustment with the radius of curvature R2 of the sensor-support-member abutting surfaces 151 of the body block 120 and also with the radius of curvature R1 of the body-block abutting surfaces 101 of the sensor support member 100. Such a positioning arrangement permits the sensor support member 100 to have its inclination, etc., adjusted with respect to a plurality of axes perpendicular to the optical axis. After the positioning adjustment, the sensor support member 100 is secured by bonding to the body block 120.

The sensor 90 is fixed by bonding to the sensor holder 80, so that the sensor holder 80 and the sensor 90 are united into the sensor unit 200.

The sensor unit 200 is held in position with respect to the body block 120 through the sensor support member 100. After the inclination, position, etc., of the sensor 90 are adjusted, the sensor unit 200 is secured by bonding to the sensor support member 100. The sensor holder 80 is provided with a groove for leading an adhesive to a bonding face of the sensor support member 100.

In the case of the embodiment disclosed above, the invention is applied to the adjustment of the sensor in the focus detecting device. However, the invention is of course applicable also to the adjustment of mechanisms other than that of the sensor.

What is claimed is:

1. A focus detecting device comprising:
   a) a focus detecting sensor;
   b) a first holding member which holds said focus detecting sensor; and
   c) a second holding member which holds at least an optical element,
      wherein at least one of a joint surface formed on said first holding member for joining with said second holding member and a joint surface formed on said second holding member for joining with said first holding member is in a curved surface shape.

2. A focus detecting device according to claim 1, wherein both of the joint surface formed on said first holding member for joining with said second holding member and the joint surface formed on said second holding member for joining with said first holding member are in curved surface shapes, one of said joint surfaces being in a convex curved surface shape, and the other of said joint surfaces being in a concave curved surface shape.

3. A focus detecting device according to claim 2, wherein the joint surface formed on said second holding member is in a curved surface shape having a plurality of radii of curvature.

4. A focus detecting device according to claim 3, wherein one of the radius of curvature of the joint surface formed on said second holding member is substantially equal to a radius of curvature of the joint surface formed on said first holding member.

5. A focus detecting device according to claim 3, wherein the joint surface formed on said first holding member is a spherical surface of radius of curvature R1, and the joint surface formed on said second holding member is in such a curved surface shape that an arc of radius of curvature R2 is drawn with a groove of radius of curvature R1 in a depth direction thereof.

6. A focus detecting device according to claim 1, wherein at least one of the joint surface formed on said first holding member and the joint surface formed on said second holding member is provided with a restricting part arranged to restrict a joint angle between said first holding member and said second holding member.

7. A focus detecting device according to claim 1, wherein the joint surface formed on said first holding member for joining with said second holding member is located at two ends of said first holding member.

8. A focus detecting device according to claim 1, wherein said second holding member holds a field lens and a reimaging lens.

9. An apparatus provided with a focus detecting device, said apparatus comprising:
   a) a focus detecting sensor;
   b) a first holding member which holds said focus detecting sensor; and
   c) a second holding member which holds at least an optical element,
      wherein at least one of a joint surface formed on said first holding member for joining with said second holding member and a joint surface formed on said second holding member for joining with said first holding member is in a curved surface shape.

10. An apparatus according to claim 9, wherein both of the joint surface formed on said first holding member for joining with said second holding member and the joint surface formed on said second holding member for joining with said first holding member are in curved surface shapes, one of said joint surfaces being in a convex curved surface shape, and the other of said joint surfaces being in a concave curved surface shape.

11. An apparatus according to claim 10, wherein the joint surface formed on said second holding member is in a curved surface shape having a plurality of radii of curvature.

12. An apparatus according to claim 11, wherein one of the radius of curvature of the joint surface formed on said second holding member is substantially equal to a radius of curvature of the joint surface formed on said first holding member.

13. An apparatus according to claim 11, wherein the joint surface formed on said first holding member is a spherical surface of radius of curvature R1, and the joint surface formed on said second holding member is in such a curved surface shape that an arc of radius of curvature R2 is drawn with a groove of radius of curvature R1 in a depth direction thereof.

14. An apparatus according to claim 9, wherein at least one of the joint surface formed on said first holding member and the joint surface formed on said second holding member is provided with a restricting part arranged to restrict a joint angle between said first holding member and said second holding member.

15. An apparatus according to claim 9, wherein the joint surface formed on said first holding member for joining with said second holding member is located at two ends of said first holding member.

16. An apparatus according to claim 9, wherein said second holding member holds a field lens and a reimaging lens.

* * * * *